United States Patent [19]

McIntosh et al.

[11] 4,309,232
[45] Jan. 5, 1982

[54] METHOD AND APPARATUS FOR FABRICATING HIGH PRESSURE HOSE

[75] Inventors: Billy R. McIntosh; Lawrence R. Jones, both of Salisbury, N.C.

[73] Assignee: Carolina Rubber Hose Company, Salisbury, N.C.

[21] Appl. No.: 115,221

[22] Filed: Jan. 25, 1980

[51] Int. Cl.³ .............................................. B65C 1/00
[52] U.S. Cl. ....................................... 156/64; 156/190; 156/195; 156/344; 156/350; 156/432; 156/584
[58] Field of Search ........ 156/143, 149, 195, 428–432, 156/344, 584, 64, 190, 425, 155, 350; 242/54 R

[56] References Cited

U.S. PATENT DOCUMENTS

| | | | |
|---|---|---|---|
| 1,913,327 | 6/1933 | Barnes | 156/149 |
| 2,630,157 | 3/1953 | Smellie | 156/143 X |
| 2,731,067 | 1/1956 | Miller | 156/432 X |
| 2,731,070 | 1/1956 | Meissner | 156/143 |
| 3,083,130 | 3/1963 | Strandquist | 156/432 X |
| 3,128,216 | 4/1964 | Reed | 156/184 |
| 3,296,047 | 1/1967 | Parr | 156/195 X |
| 3,351,509 | 11/1967 | Richardson et al. | 156/195 |
| 3,357,456 | 12/1967 | Grawey et al. | 138/127 |
| 3,414,448 | 12/1968 | Harpfer | 156/149 |
| 3,428,507 | 2/1969 | Ball | 156/195 X |
| 3,604,461 | 9/1971 | Matthews | 138/125 X |
| 3,891,489 | 6/1975 | Bordner et al. | 156/171 |
| 3,957,085 | 5/1976 | Ball | 138/129 |
| 3,988,188 | 10/1976 | Johansen et al. | 156/143 |
| 4,175,992 | 11/1979 | Grawey | 156/143 |

*Primary Examiner*—David A. Simmons
*Attorney, Agent, or Firm*—Joseph Januszkiewicz

[57] ABSTRACT

A method and apparatus is provided for continuously fabricating a high pressure hose, or the like, which includes axially advancing interconnected hollow mandrels through a plurality of winding stations wherein all of the hose building components are helically wound upon the advancing mandrels. A heat shrinkable webbing may also be wound upon the advancing mandrels so as to cover the hose components. The mandrels are then separated, and steam is introduced into the interior of the mandrels to effect curing of the hose components, with the shrinkable webbing acting to radially compact the components to remove air pockets and smoothly conform the innermost component against the mandrel. A method and apparatus is also provided for unwinding the shrinkable webbing from the hose after curing, and which includes a drive control system which advances the hose through an unwinding deck while insuring that the webbing being withdrawn from the hose is aligned with its take-up spool.

11 Claims, 16 Drawing Figures

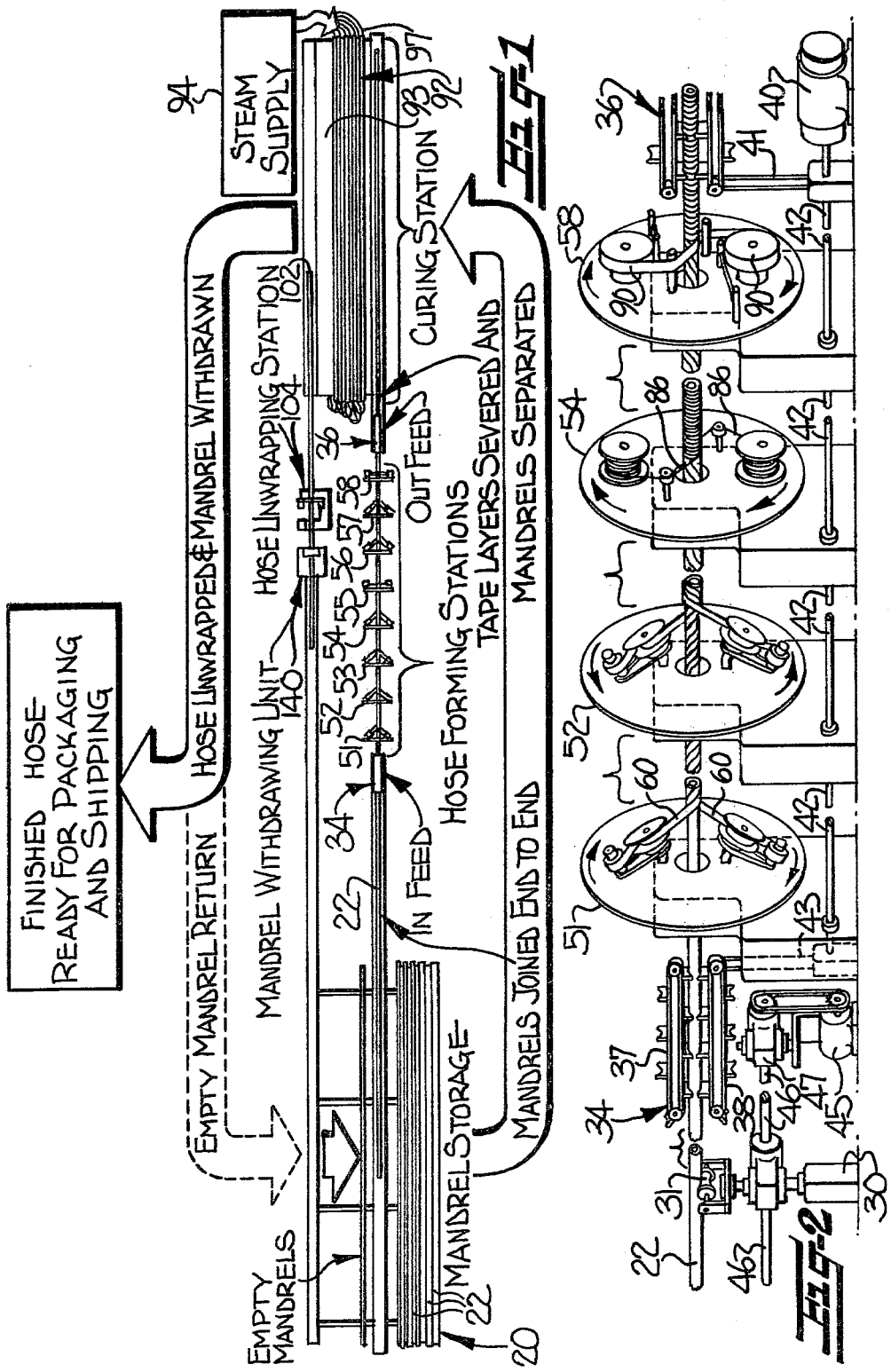

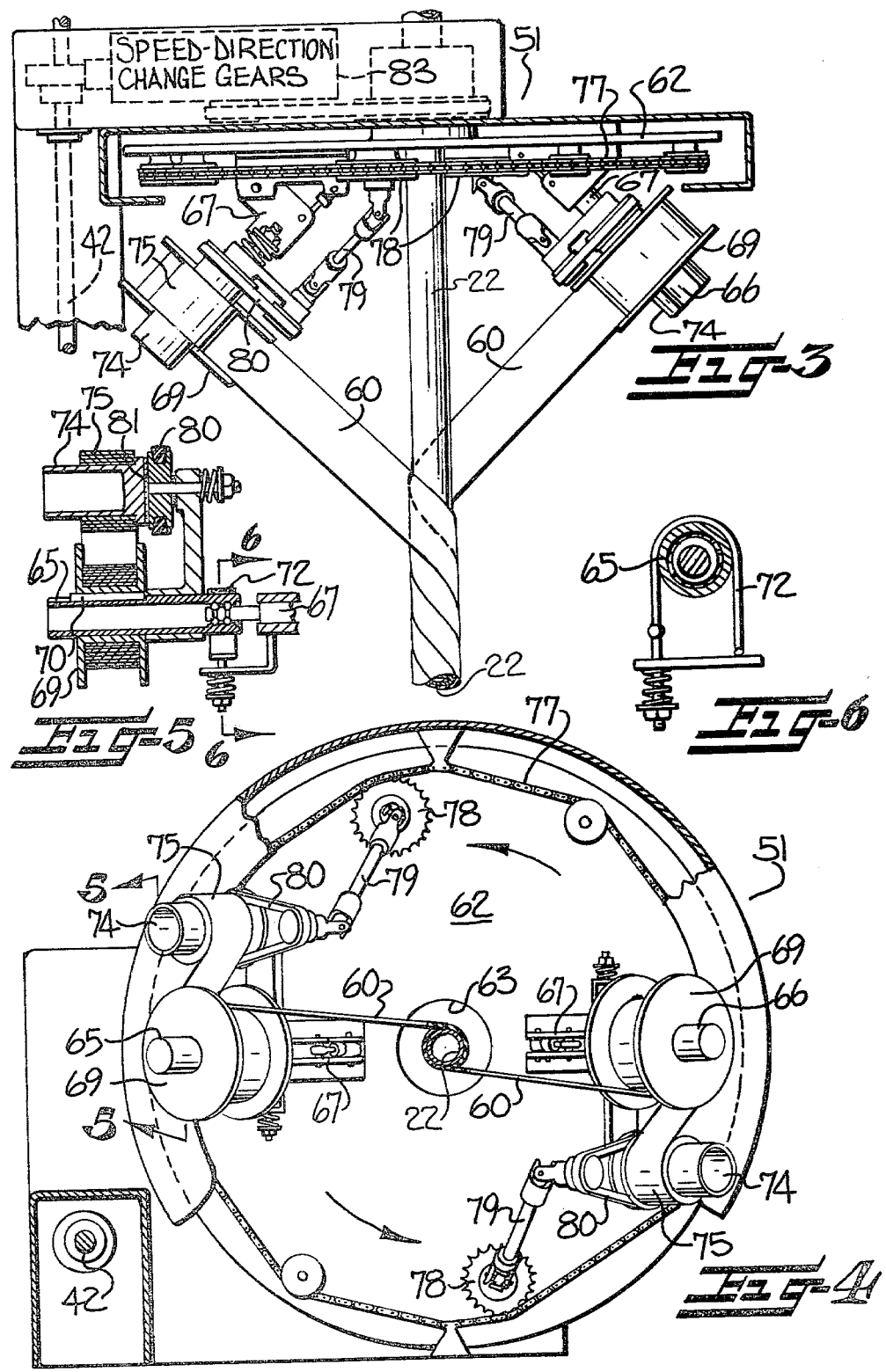

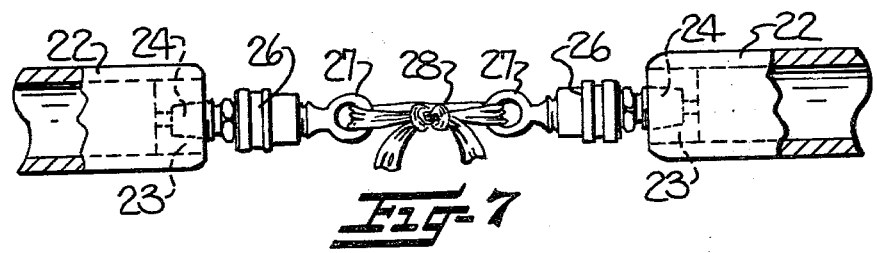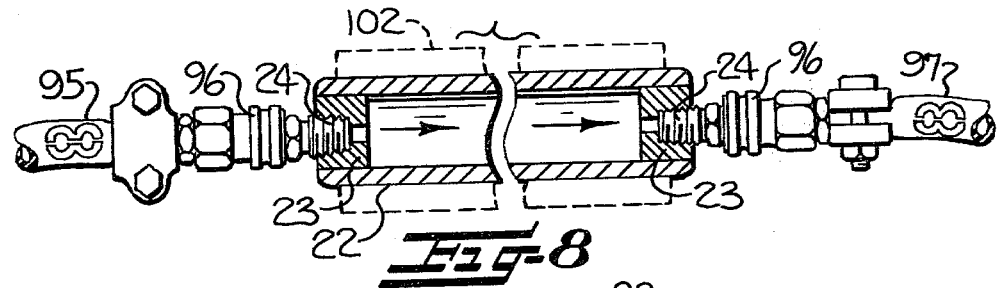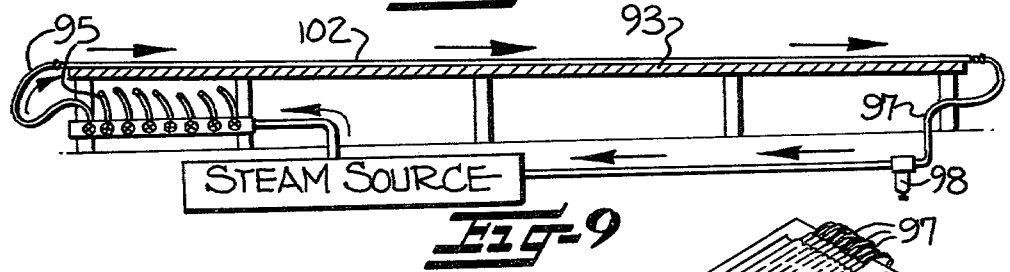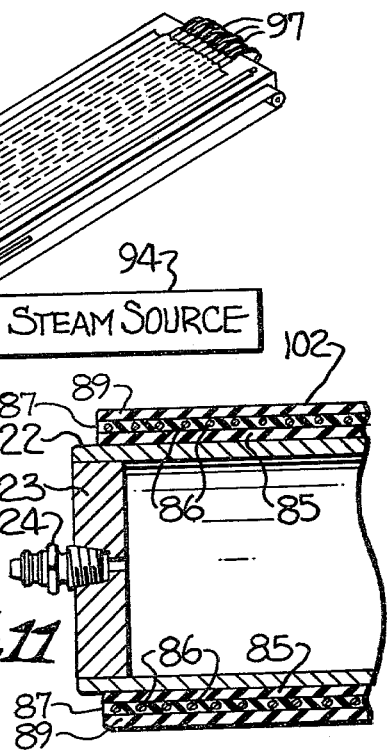

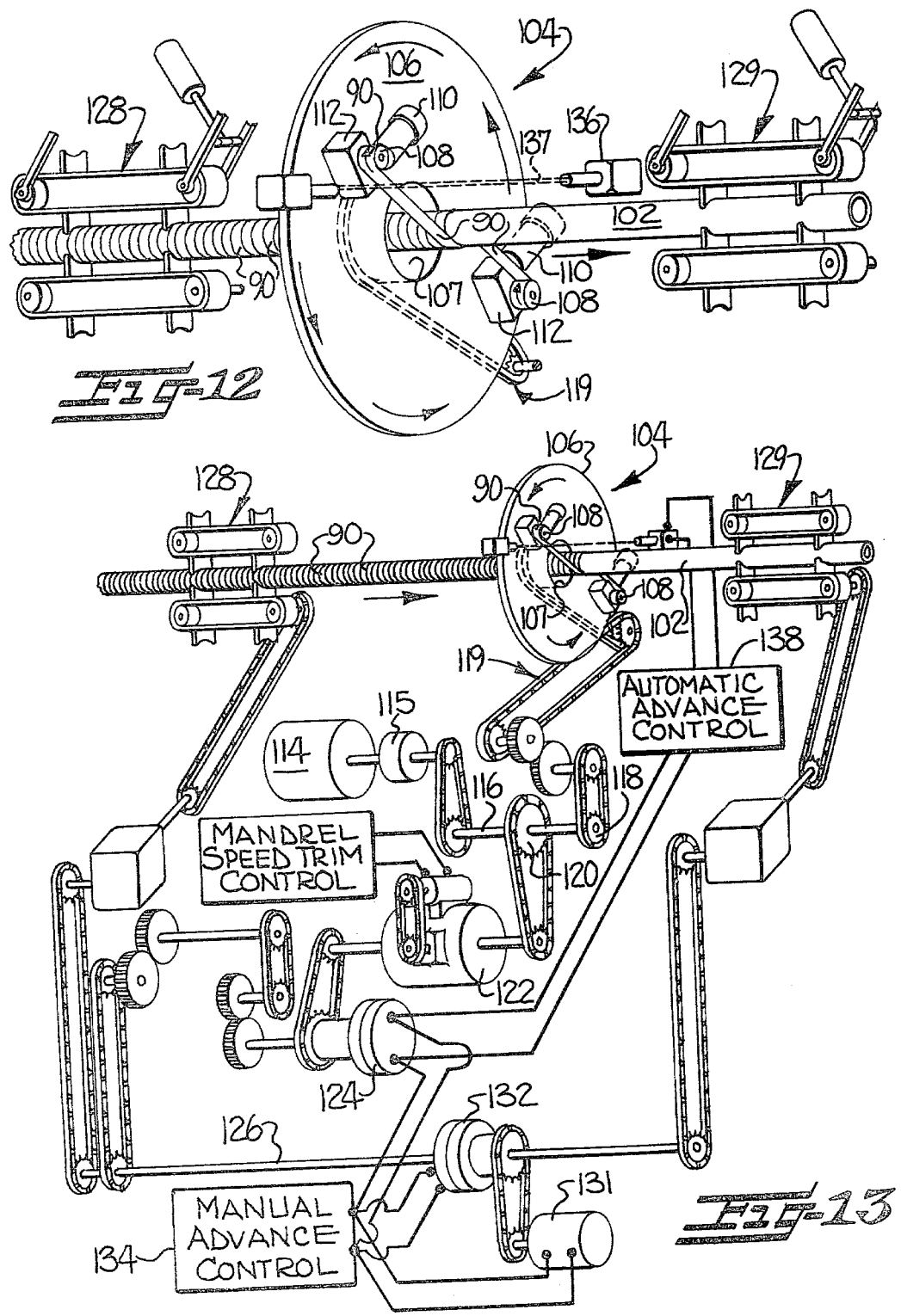

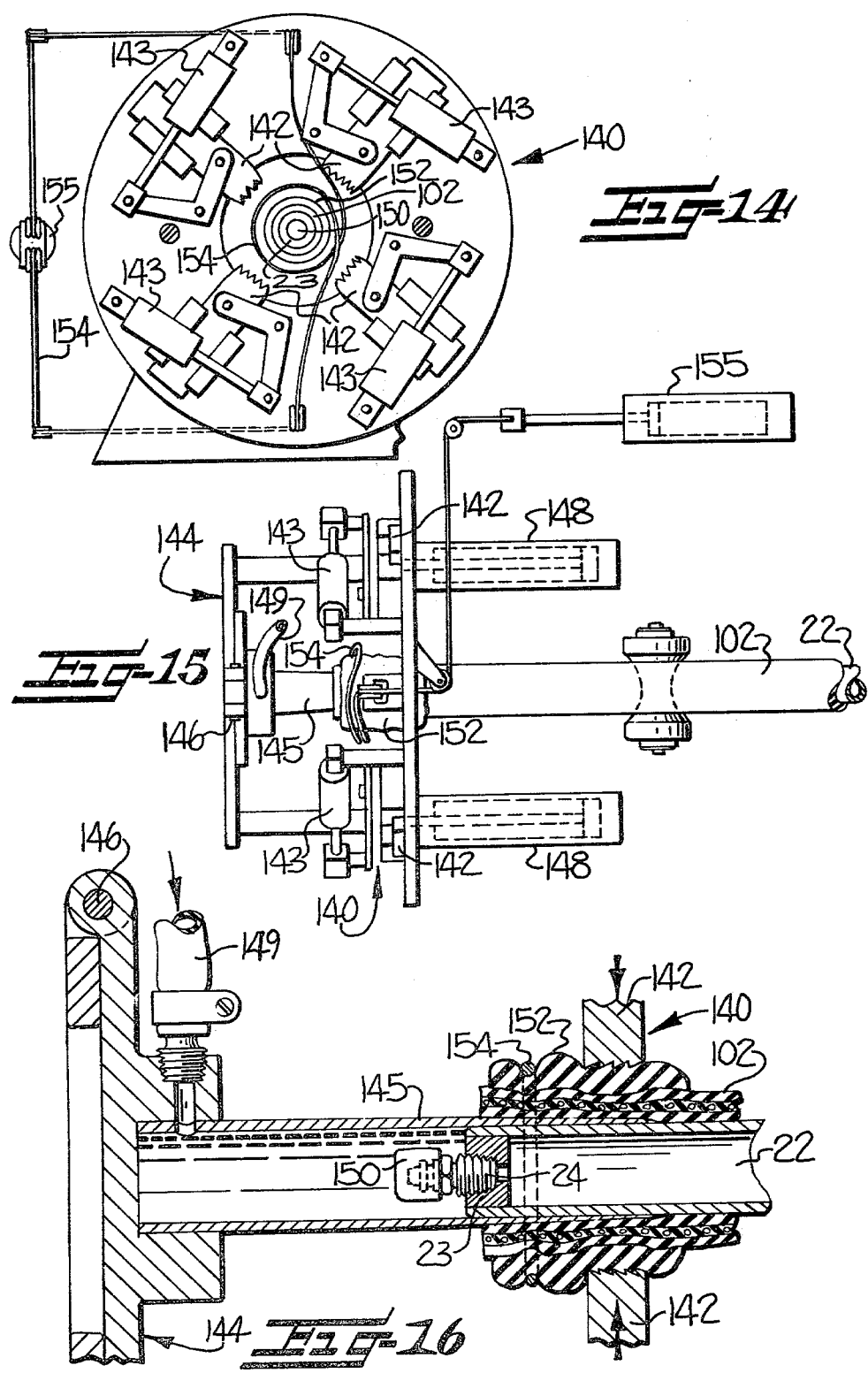

METHOD AND APPARATUS FOR FABRICATING HIGH PRESSURE HOSE

Field of the Invention

The present invention relates to a method and apparatus for fabricating a multiple layered hose adapted for high pressure fluid transmission, or other similar uses.

BACKGROUND OF THE INVENTION

It is conventional practice to manufacture high pressure hydraulic hose or the like by first extruding a hollow tube of elastomeric material, and then drawing the extruded tube upon a cylindrical supporting mandrel. The supported tube is then spirally wrapped with a number of fabric reinforcing tapes, and then with additional tapes of elastomeric material for forming the outer hose cover. Where the hose is designed for very high pressure or vacuum applications, it is also common to helically wind one or more reinforcing wires between the layers of the reinforcing tapes. The entire assembly is then placed in an elongate steam vulcanizing chamber, wherein the extruded tube and wrapped tapes are cured and adhered together to form an integral hose. As a final step, the mandrel is withdrawn, typically by using hydrostatic pressure to axially push the mandrel from the hose.

Hose manufactured by the above conventional procedure necessarily has a relatively thick inner core layer, since the extruded tube which forms this layer must be sufficiently thick to provide adequate strength to permit the tube to be drawn over the supporting mandrel. Thus the inner core layer imparts unnecessary rigidity to the hose, and it contains more material than would otherwise be required.

Difficulties have also been encountered in maintaining the quality of hose produced by the above conventional procedure. In particular, it is common for air to be entrapped between the various tape layers during the manufacturing process, resulting in air pockets being formed in the wall of the hose. As will be apparent, these air pockets significantly reduce the structural integrity of the wall, and can result in the premature failure of the hose. Further, it is difficult to achieve a uniformity in the thickness of the layers, and to achieve a smooth internal bore, in hose produced by the above conventional process.

It is also known to extrude the tube directly onto a moving mandrel by a procedure known as "cross heading" in the industry. While this procedure eliminates the step of drawing an extruded tube upon a mandrel, it nevertheless requires the shaping and handling of a relatively thin and hot plastic material, and undesirable deformation or the formation of pin holes in the material are very real problems.

It is accordingly an object of the present invention to provide a method and apparatus for fabricating hose which effectively overcomes the above deficiencies in known manufacturing processes.

It is a more particular object of the present invention to provide a method and apparatus for producing a high quality, relatively lightweight and flexible elastomeric hose, and which permits the hose to be fabricated in a variety of constructions which are specifically designed for the transmission of solid, liquid, gaseous, or other fluid material, and under low, medium, or high pressure or vacuum conditions.

It is another specific object of the present invention to provide a method and apparatus for producing a hose of the described type and which is characterized by a relatively thin and flexible inner core layer which has a smooth bore, by uniform reinforcing and cover layers, and by the substantial absence of air pockets or pin holes in the wall thereof.

It is a further object of the present invention to provide a highly efficient and economical method and apparatus for the continuous fabrication of high pressure hose in extremely long lengths, and wherein the need for a vulcanizing chamber is eliminated.

SUMMARY OF THE INVENTION

These and other objects and advantages of the present invention are achieved in the embodiment illustrated and described herein by the provision of a method and apparatus which includes serially advancing a plurality of elongate cylindrical mandrels in an end-to-end arrangement along a horizontal path of travel, while helically winding a plurality of tapes of heat curable polymeric material upon the advancing mandrels. The thus formed tape layers are periodically severed at a point between each pair of adjacent mandrels, and the forward mandrel is then separated from the trailing mandrel. Each separated mandrel is heated to cure the tape layers thereon to form an integral hose, and the mandrel is then withdrawn from the integral hose formed thereon.

In accordance with the preferred embodiment, the tapes forming the inner core layer are wound directly upon the mandrels, and all of the tapes are wound under tension to provide substantially improved control of the thickness and uniformity of the layers. Further, the mandrels are preferably hollow, and a heat shrinkable fabric webbing may be wound upon the tape layers at a final downstream winding station. The curing is accomplished by directing steam into the hollow interior of each separated mandrel to cure the tape layers while causing the fabric webbing to shrink and radially compress the tape layers against the mandrel, to thereby substantially eliminate entrapped air.

The present invention also includes a method and apparatus for efficiently removing the curing webbing which may be helically wound upon the exterior of the hose, and which comprises advancing the hose along a horizontal axis, withdrawing the webbing from the exterior of the hose and winding the same upon a take-up spool which is rotating about its rotational axis and revolving about the horizontal axis. In addition, the longitudinal position of the webbing is sensed as it is withdrawn from the hose and the advancing speed of the hose is adjusted with respect to the revolving speed of the take-up spool so as to maintain the alignment of the webbing with the take-up spool.

BRIEF DESCRIPTION OF THE DRAWINGS

Some of the objects having been stated, other objects will appear as the description proceeds, when taken in connection with the accompanying drawings in which—

FIG. 1 is a schematic plan view illustrating a method and apparatus embodying the features of the present invention;

FIG. 2 is a fragmentary view of the winding stations and the mandrel advancing system of the illustrated embodiment;

FIG. 3 is a plan view of one of the winding stations, with portions thereof being illustrated schematically;

FIG. 4 is a front elevation view of the winding station of FIG. 3;

FIG. 5 is a sectional view of the tape delivery spool and liner take-up spool of the winding station, and taken substantially along the line 5—5 of FIG. 4;

FIG. 6 is a sectional view of the brake control for the take-up spool and taken substantially along the line 6—6 of FIG. 5;

FIG. 7 is an elevation view illustrating the structure of the ends of the mandrels, and the manner in which they may be interconnected;

FIG. 8 is a sectional elevation view of a mandrel illustrating the coupling means for connecting the steam lines thereto during the curing process;

FIG. 9 is a sectional elevation view of the curing support table for the mandrels;

FIG. 10 is a perspective view of the curing support table seen in FIG. 9;

FIG. 11 is a fragmentary sectional view of the end of a mandrel with the cured hose positioned thereon;

FIG. 12 is a fragmentary perspective view of the unwinding station for removing the heat shrinkable fabric webbing from the surface of the hose;

FIG. 13 is a view similar to FIG. 12 and further schematically illustrating the drive system for the unwinding station;

FIG. 14 is a front elevation view of a centering and gripping chuck for securing the hose during the hydrostatic removal of the mandrel;

FIG. 15 is a plan view of the gripping chuck as seen in FIG. 14; and

FIG. 16 is a fragmentary sectional view of a portion of the apparatus for hydrostatically removing the mandrel from the hose.

DESCRIPTION OF THE ILLUSTRATED EMBODIMENT

Referring more specifically to the drawings, FIG. 1 is a schematic plan view illustrating the overall method and apparatus of the present invention. In this regard, there may be provided a mandrel storage area at 20, wherein a plurality of elongate cylindrical mandrels may be stored for use. Typically, there will be provided a number of mandrels 22 of each of a variety of diameters, ranging for example from about one to six inches, to permit fabrication of different hose sizes on the apparatus. As best seen in FIGS. 7, 8 and 11, the mandrels 22 are hollow, and each end is closed by a plug 23 having a nipple 24 fixed therein. The mandrels typically range from forty to sixty feet in length, although almost any length is usable with the present invention.

The mandrels 22 of a selected size are initially joined in a coaxial, end-to-end arrangement as illustrated in FIG. 7. For this purpose, a female quick release coupling 26 of conventional design is joined to each of the adjacent nipples 24. The coupling 26 includes an integral tie ring 27, and a piece of fabric, rope, or other readily severable material 28 is tied between the rings of the adjacent couplings.

The mandrels 22 are supported at the upstream end of the apparatus by a number of spaced stands 30 (FIG. 2) each having a roller 31 for supporting the mandrels for axial movement. Similar stands may be provided along the full length of the machine and between the winding stations as hereinafter described, for the purpose of maintaining a desired elevation of the advancing mandrels.

An upstream drive unit 34 is provided for axially advancing the mandrels through the winding stations and to the downstream drive unit 36. Each drive unit is of generally conventional "caterpillar" type, and includes a mating pair of endless chains 37, 38 which are adapted to respectively engage the upper and lower sides of the advancing mandrels 22. The two mating chains 37, 38 are driven in unison to advance the mandrels, and both the upstream and downstream drive units are powered from a common electric motor 40, which is positioned at the downstream end of the apparatus. More particularly, the motor 40 is operatively connected to the downstream drive unit 36 as schematically illustrated at 41, and it also rotates the line shaft 42 which extends along the winding stations and is operatively connected to the upstream drive unit 34 as schematically indicated at 43.

The elevation of each of the support stands 30, and the two drive units 34, 36, is adjustable so that mandrels of various diameters may be accurately centered as they pass through the winding stations. This elevation control includes an electric motor 45 at the upstream end of the apparatus, which acts via the shaft 46 to concurrently operate a screw jack 47 at each stand and the upstream drive unit. A similar motor and elevation control system (not shown) is provided for the downstream drive unit 36.

In the illustrated embodiment, a total of eight winding stations 51–58 are provided along the path of travel of the mandrels. While a specific number, orientation, and structure for the winding stations will be described herein, it will be understood from the following description that the stations are each readily adaptable to apply various other hose building materials to the advancing mandrels to obtain a variety of hose constructions.

Winding station 51 is illustrated in some detail in FIGS. 3–6, and is adapted for helically winding a pair of heat curable polymeric tapes 60 in overlapping convolutions upon the advancing mandrel. More particularly, the station 51 includes a circular deck 62 mounted for rotation about the longitudinal axis of the advancing mandrels, and the deck includes an opening 63 therethrough which is coaxial with such axis. A pair of mounting shafts 65, 66 are rotatably mounted on the deck by an arrangement which includes a pivotable angle arm 67 (note FIG. 3), whereby the angle of each mounting shaft may be adjusted with respect to the longitudinal axis of the advancing mandrels. Each mounting shaft is adapted to receive a tape delivery spool 69 which is held against relative rotational movement thereon by a key 70 (FIG. 5), and there is further provided a strap braking device 72 for restraining the free rotation of the shaft and thus the delivery spool, note FIGS. 5 and 6. By design, the tape 60 carried on each spool 69 may be withdrawn by applying a predetermined tensile force on the tape which is sufficient to overcome the braking force on the associated shaft.

As illustrated, each of the stations 51–53 and 55–57 further include a take-up spool 74 associated with each delivery spool 69, and which is adapted for winding thereon an interleaving paper liner 75 or the like which may be wound with the tape 60 upon the delivery spool. The take-up spools 74 are positively driven, by an arrangement which includes a fixed circumferential chain 77 mounted adjacent the periphery of the deck, and a mating sprocket 78 which is fixed to the deck so as to "walk"0 about the chain as the deck rotates. The sprocket 78 is operatively connected to the spool 74 via a universal joint and axle assembly 79, a drive belt and pulley assembly 80, and a slip clutch surface 81 between the pulley and spool, note FIG. 5.

The decks of all of the winding stations are rotated by means of a gear or chain drive assembly which operatively interconnects the deck with the line shaft 42, and which includes a series of changeable gears as shown schematically at 83 in FIG. 3. Thus the advance of the mandrels 22 and the rotation of each of the decks are powered from a common drive motor 40, and by adjusting the ratio of the gears 83 at each station, the speed of rotation of each deck may be independently changed with respect to the advancing speed of the mandrels. Also, by design, the changeable gears 83 may be oriented to reverse the direction of rotation of the deck if so desired. This adjustability permits the angle and direction at which the hose building material is wound upon the mandrels to be adjusted for each deck.

To now describe the operation of the winding stations 51–58, it will be understood that the drive motor 40 acts to advance the mandrels axially through the several stations, while rotating each deck in a preselected direction and speed. The tape or other hose building material on the spools 69 is helically wound upon the advancing mandrels as best seen in FIG. 3, and such that the advance of the mandrel acts to exert a sufficient tensile force on the tape to overcome the resistance of the brake 72 and permit its withdrawal. Further, the resistance force from the brake acts to cause the tape to be applied under tension, which assures its uniform application.

Each of the winding stations 51–53 and 55–57 are of the structure as described above, with the station 51 rotating in a clockwise direction to apply overlapping convolutions of two tapes consisting of heat curable polymeric material, such as vinyl, rubber, or polyethylene, which forms the solid inner core layer 85 of the resulting hose, note FIG. 11.

The stations 52 and 53 each apply overlapping convolutions of two tapes of heat curable polymeric material, which is reinforced by an internal fabric, tire cord, wire, or the like. Station 52 applies its two tapes in a counterclockwise direction, while station 53 applies its tapes in a clockwise direction. Station 54 is of somewhat modified structure to permit two wires 86 to be spiraled between the reinforcing layers, which is a desirable construction in the case of vacuum and high pressure hoses. As will be apparent, the station 54 may be designed to apply a different number of wires as dictated by the desired construction of the hose. As shown, the deck of station 54 rotates in a clockwise direction, and at a relatively high rate of speed, to spiral the wires in relatively close convolutions. Stations 55 and 56 are essential duplicates of stations 52 and 53, respectively, and apply additional reinforcing tapes. The reinforcing tapes applied by the stations 52, 53, 55, and 56 and the intermediate wire 86 applied by station 54, combine to form the reinforcing layer 87 of the resulting hose (FIG. 11).

Station 57 is essentially a duplicate of station 51 and applies two tapes consisting of polymeric material, and which become the solid cover layer 89 of the resulting hose. Station 58 is modified to permit it to apply overlapping convolutions of two heat shrinkable fabric webbings 90, such as nylon cure tape, upon the underlying polymeric layers.

From the winding stations, the interconnected mandrels and overlying tape layers pass through the downstream drive unit 36 and to a curing station 92 (FIG. 1). Upon a mandrel reaching the curing station, the tape layers and interconnecting material 28 are severed, by a knife (not shown) or the like, at a point between the mandrels, so as to separate the forward mandrel from the trailing mandrel. Also, the coupling 26 (FIG. 7) is removed from each end of the separated mandrel. The separated mandrel is then positioned on the curing support table 93.

The curing of the hose components is accomplished by introducing steam into the interior of the mandrels while positioned on the tabe 93. More particularly, there is provided a boiler or other steam source 94, and a plurality of steam lines 95 lead from a header at the left end of the table as seen in FIG. 9. The lines 95 each include a releasable coupling 96 of conventional design for engaging the nipple 24 of the mandrel. A steam return line 97 is provided at the opposite end of the table for each mandrel, which leads through a condensate trap 98 back to the steam source. It will be noted in FIG. 9 that the table 93 is inclined along its length, such that the steam condensate forming within the mandrels will drain to a common end and to the condensate trap, to thereby facilitate its removal. An insulating blanket 99 is preferably disposed over the mandrels on the table to reduce heat loss.

As a typical example, steam at a temperature of about 300 degrees F. and a pressure of 60–70 psi, is introduced into the mandrels, for a period of 2 ½ to 3 hours. During this time period, the mandrels are preferably periodically rotated about their axes to compensate for the fact that the upper portion of the mandrel will become slightly more hot than the lower portion, and uneven heating and curing might otherwise result. For example, the mandrels might be rotated after each quarter of the overall curing time, first by 180 degrees, then 90 degrees, and then 180 degrees. It will also be understood that the fabric webbing 90 will shrink during the curing operation, to radially compress the various tape layers against the mandrel to effectively eliminate air pockets in the wall of the resulting hose, and also to cause the innermost tape layers to smoothly conform to the surface of the mandrel, and thereby provide a smooth bore surface in the resulting hose.

After curing, the mandrels and cured hose 102 are moved through an unwinding station 104 wherein the two fabric webbings 90 applied at the winding station 58 are removed from the hose 102. In accordance with the present invention, there is provided a method and apparatus for efficiently removing the webbing, and which includes an unwinding deck 106 mounted for rotation about a longitudinal axis and having an opening 107 therethrough which is coaxial with such axis. A pair of take-up spools 108, which are each adapted for winding a fabric webbing thereon, are mounted on the deck 106 for rotation about a rotational axis which is disposed generally parallel to and radially spaced from the longitudinal axis. A pair of constant torque electrical motors 110 are also mounted on the deck, with each motor being operatively connected to one of the take-up spools 108 through a suitable gear reducer 112.

The unwinding apparatus further includes drive means as best seen in FIG. 13 for advancing the mandrel 22 and hose 102 coaxially along the longitudinal axis to cause each take-up spool 108 to revolve about such axis, whereby each fabric webbing 90 is adapted to be unwound from the hose and wound upon one of the rotating and revolving take-up spools.

The drive means of the unwinding station 104 comprises a main drive motor 114, which operates through a gear reducer 115 to rotate a line shaft 116. One output sprocket 118 on the line shaft operates through a "pivoting spindle" assembly 119 to rotate the deck 106, and which is also adapted to accommodate the raising and lowering of the deck by a suitable mounting structure (not shown) so that the opening 107 in the deck may be centered on the longitudinal axis of the particular sized mandrel and hose. A second output sprocket 120 on the line shaft transmits rotation through a manually adjustable speed trimming device 122 of known construction for the purposes to be described. From the trimming device 122, the rotation is transmitted through a first electric clutch 124, and then through suitable gear and chain drives as illustrated and to a second line shaft 126. The second line shaft 126 is in turn connected via further chain drives and reduction gears to an upstream drive unit 128 and a downstream drive unit 129, each of which has a structure comparable to that described above with respect to the drive units 34 and 36.

The drive means of the station 104 is further provided with separate means for advancing the mandrel and hose coaxially through the apparatus and through the opening of the deck, and without rotating the deck, to facilitate the initial positioning of the hose in the apparatus and the final removal of the hose therefrom. This separate advancing means comprises a second electric motor 131, which is operatively connected to an electric clutch 132 for rotating the second line shaft 126 when the clutch 132 is closed. A manual advance control system 134 is provided for the motor, which when activated, closes the clutch 132 and opens the clutch 124, whereby the rotation from the motor 131 is transmitted to the two drive units 128 and 129, but not to the deck 106.

The drive means also includes an electric eye system 136 mounted adjacent the deck for directing a control beam 17 so as to sense the longitudinal position of the fabric webbing 90 as it is unwound from the hose. An automatic advance control system 138 is operatively connected to the electric eye, and is adapted to adjust the speed of the advance of the hose relative to the rotational speed of the deck to maintain the alignment of the take-up spool 108 with the webbing being unwound from the hose. This adjustment of speed is accomplished by selectively disengaging the clutch 124, which disengages the drive units 128 and 129 while maintaining the rotation of the deck 106. In this regard, the speed trim control 122 is initially manually set so that the advancing speed is slightly greater than necessary, so that the automatic control 138 can effectively operate by periodically disengaging the advance of the mandrel and hose. Also, the speed trim control 122 permits the advance speed to be manually adjusted so as to avoid excessive operation of the automatic control system.

As the final step of the process, the mandrel 22 is axially withdrawn from the hose 102 formed thereon. An apparatus for performing this operation through the use of hydrostatic pressure is illustrated in FIGS. 14–16, and comprises a chuck 140 having four gripping jaws 142 which are selectively movable between an open position (FIG. 14) and a closed position (FIG. 16) by means of the hydraulic cylinders 143. Also, there is provided a water infeed device 144 which includes a cylindrical tube 145 mounted for pivotal movement about the axis of pin 146 to permit the tube 145 to swing out of the way and thereby permit the mandrel and hose to be fed therethrough. Also, the infeed device is mounted for axial movement by the hydraulic cylinders 148, and the tube 145 has a free end which is adapted to be slipped over the mandrel and beneath the hose as seen in FIG. 16, upon axial movement. The opposite end of the tube is connected to a high pressure water line 149.

In operation, the mandrel 22 and hose 102 are fed axially through the chuck 140, and the nipple 24 at the trailing end of the mandrel is closed by a suitable cap 150. The tube 145 of the water infeed device is then forced axially between the mandrel and hose by operation of the hydraulic cylinders 148, and a protective and sealing wrap 152 is positioned over the tube and clamped thereto by a wire cord 154, which is adapted to be drawn about the wrap by the hydraulic cylinder 155. Next, the jaws 142 are closed, and water is then admitted into the tube to force the mandrel forwardly, while the tube is held against the movement by the jaws acting through the wrap.

In the drawings and specification, there has been set forth a preferred embodiment of the invention, and although specific terms are employed, they are used in a generic and descriptive sense only and not for purposes of limitation.

That which is claimed is:

1. A method for efficiently removing a fabric webbing or the like which is helically wound upon the exterior of an elongate hose or the like, and comprising the steps of advancing the hose along a path of travel so as to define a longitudinal axis, withdrawing the webbing from the exterior of the hose and winding the same upon a take-up spool which is rotating about its rotational axis, and including either (a) rotating the hose about said longitudinal axis or (b) revolving the rotating spool about said longitudinal axis, and while continuously sensing the longitudinal position of the webbing as it is withdrawn from the hose and adjusting the advancing speed of the hose with respect to either the rotating speed of the hose or the revolving speed of the spool, and so as to maintain the alignment of the webbing with the take-up spool as the webbing is withdrawn from the hose.

2. The method as defined in claim 1 wherein the take-up spool is rotated so as to apply a substantially constant tension on the webbing being wound thereon.

3. An apparatus for efficiently removing fabric webbing or the like which is helically wound upon the exterior of an elongate hose or the like, and comprising an unwinding deck mounted for rotation about a longitudinal axis and including an opening therethrough which is coaxial with said axis, at least one take-up spool adapted for winding a fabric webbing thereon and mounted on said deck for rotation about a rotational axis which is disposed generally parallel to and radially spaced from said longitudinal axis, motor means mounted on said deck for operatively rotating each of said spools about its rotational axis, drive means for advancing an elongate hose or the like coaxially along said longitudinal axis and through said opening of said deck, and for concurrently rotating said deck about said longitudinal axis to cause each take-up spool to revolve about said longitudinal axis, whereby the fabric webbing is adapted to be unwound from the hose and wound upon a rotating and revolving take-up spool, said drive means including (a) means for continuously sensing the longitudinal position of the fabric webbing as it is being unwound, and (b) control means operatively connected to said sensing means for adjusting the speed of the advance of the hose relative to the rotational speed of said deck, to maintain the alignment of the take-up spool with the webbing being unwound from the hose.

4. The apparatus as defined in claim 3 wherein said drive means further comprises selectively operable means for advancing an elongate hose or the like coaxially along said longitudinal axis and through said opening of said deck, and without rotating said deck, to facilitate the initial positioning of a hose in the apparatus and the final removal of the hose therefrom.

5. The apparatus as defined in claim 3 or 27 wherein said motor means comprises a constant torque electrical motor operatively connected to each of said take-up spools.

6. The apparatus as defined in claim 3 or 4 wherein said drive means further includes manualy adjustable speed trimming means operable independently of said sensing means, for adjusting the speed of the advance of the hose relative to the rotational speed of said deck to permit the relative speed to be adjusted and thereby avoid excessive operation of said control means.

7. The apparatus as defined in claim 6 wherein said sensing means comprises electric eye means, and said control means comprises clutch means operatively controlled by said electric eye means for selectively disengaging the advance of the hose.

8. An apparatus for continuously fabricating relatively lightweight and flexible hose adapted for high pressure fluid transmission or other similar uses, and comprising a plurality of elongate hollow cylindrical mandrels, each of said mandrels including nipple means mounted at each end thereof, means for supporting the mandrels for coaxial movement in an end-to-end arrangement along a path of travel which defines a longitudinal axis, a plurality of coupling members each adapted to releasably engage one of said nipple means of said mandrels, and each including means for facilitating the interconnection of said mandrels in an end-to-end arrangement, a plurality of winding stations disposed along said path of travel, each of said stations being operable to wind a hose building material upon mandrels coaxially advancing therealong, drive means for advancing the mandrels along the path of travel and concurrently operating each of said winding stations, whereby the hose building material of each winding station may be helically wound about the advancing mandrels at a uniform and predetermined angle with respect to said longitudinal axis, and means for heating the layers of hose building material on each mandrel to cure the same and form an integral hose thereon, and including steam supply means, and releasable coupling means for operatively engaging the nipple means at the ends of each mandrel, whereby said coupling members may be initially mounted on said nipple means to facilitate the interconnection of the mandrels, and then removed to permit said coupling means of said steam supply means to operatively engage said nipple means.

9. The apparatus as defined in claim 8 wherein said means for facilitating the interconnection of mandrels in an end-to-end arrangement comprises an integral tie ring.

10. A method for continuously fabricating relatively lightweight and flexible hose adapted for high pressure fluid transmission, or similar uses, and comprising the steps of serially advancing a plurality of elongated cylindrical mandrels in an end-to-end arrangement along a first horizontal path of travel, while helically winding a plurality of tapes of heat curable polymeric material in overlying relation upon the advancing mandrels to form a plurality of concentric tape layers, helically winding a heat shrinkable fabric webbing upon the tape layers so as to fully cover the same, and while the mandrels are advancing along the path of travel, periodically severing the thus formed tape layers and overlying fabric webbing at a point between each pair of adjacent mandrels, and separating the forward mandrel from the trailing mandrel, directing steam into the hollow interior of each separated mandrel to cure the tape layers while causing the fabric webbing to shrink and radially compress the tape layers against the mandrel and thereby form an integral hose thereon, advancing the separated mandrels and associated hoses along a second horizontal path of travel, unwinding the heat shrinkable fabric webbing from the exterior of each separated advancing mandrel and associated hose and winding the unwound webbing upon a take-up spool while rotating the spool about its axis and revolving the same about the longitudinal axis of the advancing mandrel, said unwinding step further includes sensing the axial location of said webbing as it is unwound, and adjusting the advancing speed of the mandrel and hose with respect to the revolving speed of the take-up spool as the webbing is unwound to maintain the alignment of the take-up spool with the webbing being removed, and then withdrawing the mandrels from each integral hose.

11. A method for continuously fabricating relatively lightweight and flexible hose adapted for high pressure fluid transmission, or similar uses, and comprising the steps of serially advancing a plurality of elongated cylindrical mandrels in an end-to-end arrangement along a first horizontal path of travel, while helically winding a plurality of tapes of heat curable polymeric material in overlying relation upon the advancing mandrels to form a plurality of concentric tape layers, helically winding a heat shrinkable fabric webbing upon the tape layers so as to fully cover the same, and while the mandrels are advancing along said first path of travel, periodically severing the thus formed tape layers and overlying fabric webbing at a point between each pair of adjacent mandrels, and separating the forward mandrel from the trailing mandrel, vulcanizing the overlying curable tape layers of polymeric material on each separated mandrel while causing the fabric webbing to shrink and radially compress the tape layers against the mandrel and thereby form an integral hose thereon, advancing the separated mandrels and associated hoses along a second path of travel, withdrawing said heat shrinkable fabric webbing from the exterior of said advancing mandrels and their associated hoses and winding said withdrawn fabric webbing upon a take-up spool while rotating said take-up spool about its axis and revolving the same about the longitudinal axis of the advancing mandrels, said unwinding step further includes sensing the axial location of said fabric webbing as it is withdrawn, adjusting the advancing speed of the mandrel and hose with respect to the revolving speed of said take-up spool as the webbing is withdrawn to maintain the alignment of the take-up spool with the webbing being removed, and withdrawing said mandrels from each integral hose.

* * * * *